Jan. 27, 1970     R. W. LARSON ET AL     3,491,811
RECIPROCAL BLADE SLASHER

Filed Feb. 12, 1968     2 Sheets-Sheet 1

INVENTOR.
ROBERT W. LARSON
JOHN P. LUNDBERG
RICHARD H. HUNGER

Dugger Peterson Johnson & Westman
ATTORNEYS

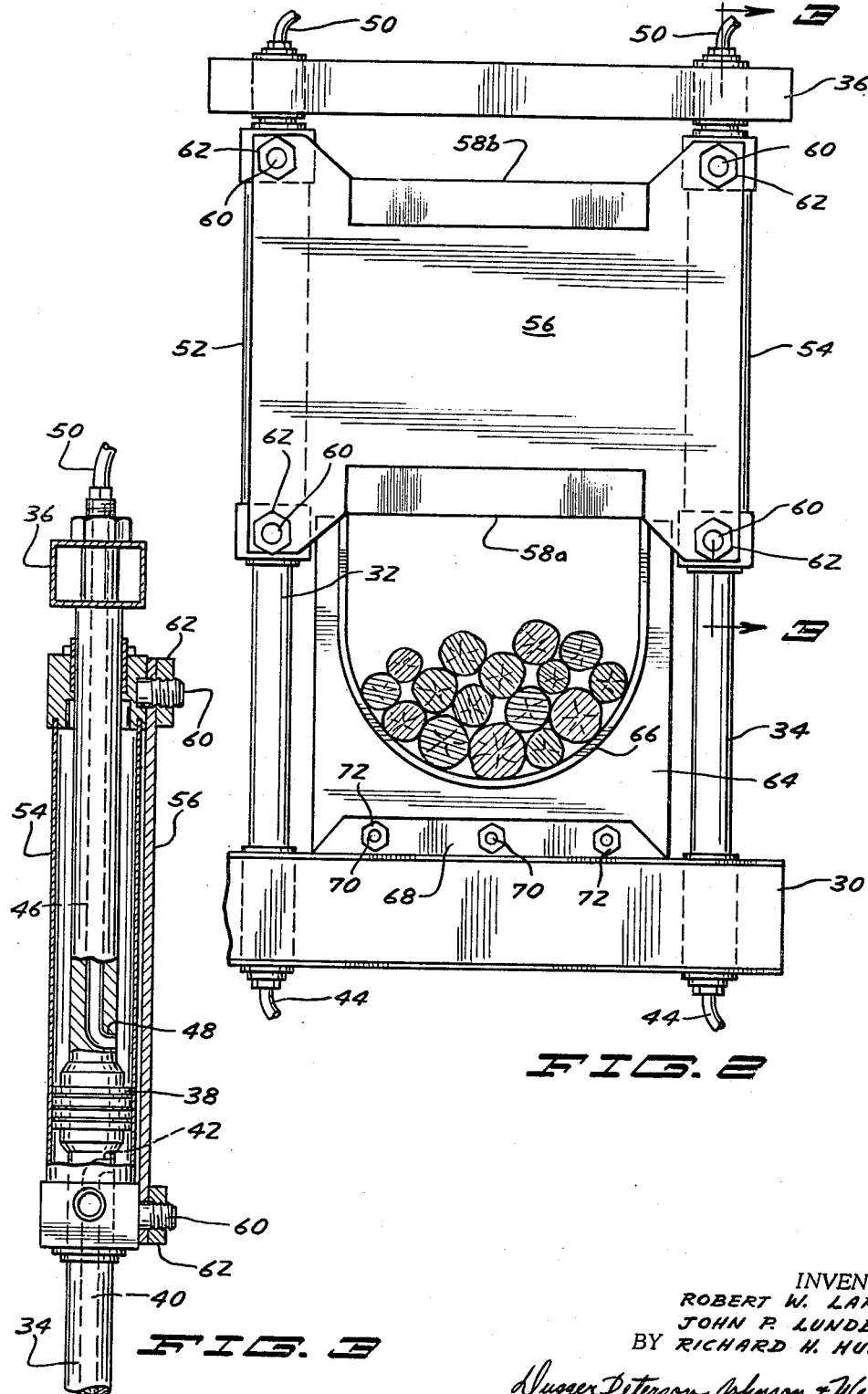

United States Patent Office 3,491,811
Patented Jan. 27, 1970

1

3,491,811
RECIPROCAL BLADE SLASHER
Robert W. Larson, Port Arthur, Ontario, Canada, John P. Lundberg, Washburn, Wis., and Richard H. Hunger, Dubuque, Iowa, assignors to Beloit Corporation, Beloit, Wis., a corporation of Wisconsin
Filed Feb. 12, 1968, Ser. No. 704,798
Int. Cl. B27m 1/00
U.S. Cl. 144—34      7 Claims

ABSTRACT OF THE DISCLOSURE

A fixed pair of laterally spaced piston rods extend generally upwardly into a pair of cylinders, the cylinders being reciprocally guided by pistons located intermediate the ends of the rods. Detachably mounted on the cylinders so as to be moved by the cylinders is a flat blade having upper and lower knife edges, the blade being reversible so that the upper knife edge can be substituted for the lower knife edge when the first edge has become dulled. Consequently, when at least one, preferably a plurality, of tree-length logs is located beneath the blade, the downward stroke of the blade will sever bolts or sticks from the tree-length logs as these logs are successively advanced into position beneath the blade. An articulated boom assembly lifts the tree-length logs onto a carriage or feed mechanism, and the carriage advances the logs beneath the vertically reciprocal blade. After the bolts have been severed, they are dropped into a collector and then gravitationally discharged.

BACKGROUND OF THE INVENTION

Field of the invention

This invention relates generally to the processing of tree-length logs, and pertains more particularly to a slasher that incorporates therein a vertically reciprocal blade.

Description of the prior art

Various slashers have been devised which make use of chain saw mechanisms for severing the bolts or sticks from tree-length logs. However, these types of slashers are relatively slow and inefficient because of the sawing action that must take place, particularly where the saw must pass through a plurality of logs. While attempts have been made to use blades that shear the logs, various problems have arisen, particularly with the actuating means for such blades and most prior art efforts have resulted in the shearing of only single logs.

SUMMARY OF THE INVENTION

The present invention relates to a reciprocally disposed shear blade having a lower knife edge and also an upper knife edge. The blade is flat and has its sides attached to vertically reciprocal cylinders that slidably encompass a pair of laterally spaced, upstanding piston rods that are fixedly anchored at their lower ends. By feeding hydraulic fluid under pressure either beneath the respective pistons located intermediate the ends of the piston rods or above said pistons, the cylinders are either forced downwardly or upwardly. By reason of the present invention, a simplified mounting structure can be utilized for the blade, the piston rods themselves serving as guides for the blade. Because of the manner in which the blade is mounted a group of logs can be sheared simultaneously. Also, the stationary piston rods will be continually wiped free of foreign matter. The blade, which as stated above is flat, can be inverted or reversed so that either its upper or lower knife edge can be effectively employed with only a brief slasher shutdown while one edge is substituted for one that has become dull.

BRIEF DESCRIPTION OF THE DRAWINGS

FIGURE 2 is a vertical view taken in the direction of line 2—2 of FIGURE 1 for the purpose of showing the blade; and FIGURE 3 is a vertical sectional view through one of the upright fixed piston rods and the slidable cylinder encompassing same.

DESCRIPTION OF THE PREFERRED EMBODIMENT

Figure 1:
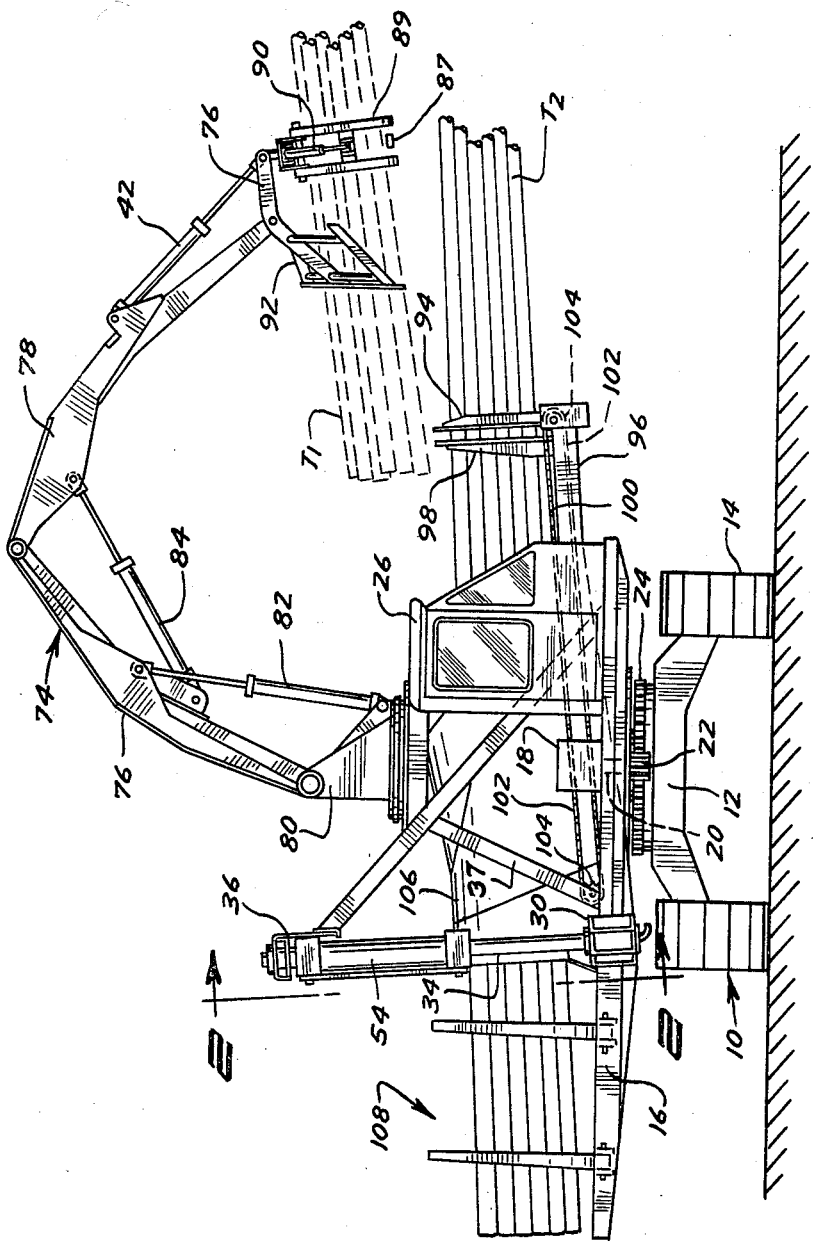
FIGURE 1 is a front view of a vehicle with the swing platform rotated perpendicularly to the direction in which the vehicle travels, this being the operative position of the swing platform and the slashing structure carried thereby.

Referring now in detail to the drawings, the vehicle has been designated generally by the reference numeral 10 and comprises a chassis 12 having a pair of endless tracks 14 by which the vehicle is propelled. Surmounted on the chassis 12 is a swing platform or support 16. The platform or support 16 can be rotated into any desired horizontal angle by a rotary hydraulic motor 18, the motor 18 having a depending shaft 20 to which is keyed a pinion 22 and which in turn is in mesh with a swing gear 24 disposed on the chassis 12. Located on the platform or support 16 is a cab 26 for housing the operator and the various controls utilized when practising the invention. Also mounted on the platform is a pump (not shown) which supplies hydraulic fluid to the motor 18, as well as hydraulic cylinders yet to be described.

A lower transverse beam 30 is integral with the platform or support 16. A pair of piston rods 32 and 34 have their lower ends fixedly anchored to the beam 30 at laterally spaced locations, the rods being generally vertical but canted slightly to the left as can be seen in FIGURE 1. Connected to the upper ends of the piston rods 32, 34 a second transverse beam 36 to which is attached suitable bracing 37 which results in the canted configuration alluded to above. As can be readily discerned from FIGURE 3, the piston rod 34 (as is the situation with the piston rod 32) has an intermediate piston 38. A first bore or passage 40 extends axially upwardly through the piston rod 34 and has a port or outlet 42, the bore 40 being supplied with hydraulic fluid via a hose or line 44. Similarly, a passage or bore 46 extends axially downwardly and has a port or outlet 48. The upper end of the bore 46 is attached to a hydraulic hose or line 50. From FIGURE 2, it will be apparent that there is actually a pair of hoses 44, one for the piston rod 32 and one for the piston rod 34. In like fashion, there is a pair of hoses 50 as can be seen from this particular figure.

A pair of cylinders 52, 54 slidably encircle or encompass the piston rods 32, 34, being constrained for reciprocal movement by reason of the pistons 38 on these two rods. A flat blade 56 has a downwardly directed knife edge 58a and an upwardly directed knife edge 58b. The blade 56 is constrained for vertical movement by means of the attachment of its sides to the cylinders 52, 54. In order to allow the flat blade 56 to be inverted or reversed, four studs 60 which are fixedly attached to the cylinders 52, 54 have nuts 62 threaded thereon. It becomes a simple expedient to remove the nuts 62 and turn the blades 56 end-to-end when circumstances so dictate.

To flat blade 56 which moves in unison with the cylinders 52, 54 coacts with a flat stationary or anvil blade 64 having an upwardly directed knife edge 66, its sides being spaced inwardly from the upstanding pistons 32, 34 sufficiently so as not to interfere with the movement of the cylinders 52, 54. The blade 64 is fixedly mounted to a flange 68 integral with said transverse beam 30. A trio of bolts 70 having nuts 72 threaded thereon permit the otherwise fixed blade 64 to be removed if need be.

A boom assembly 74, composed of a main boom 76 and an end boom 78, is provided. Suitable pivot pins render the boom assembly 74 articulative in a vertical plane. In order to swing the boom assembly 74 so as to align tree-length logs with the vertically disposed blades 56, 64, there is a captan 80 which can be rotated about a vertical axis by an appropriate rack and pinion drive, such as that depicted in FIGURE 1 of U.S. Patent No. 3,294,131 granted on Dec. 27, 1966 to Robert W. Larson and which patent is assigned to the present assignee. In this way, the boom assembly 74 can be swung into various angular positions to first pick up the tree-length logs and then angularly orient them for feeding to the blades 56, 64. As mentioned above, the boom assembly 74 is articulated and the main boom 76 can be raised and lowered in whatever vertical plane that is determined by the capstan 80, there being a hydraulic ram 82 for performing this function. Similarly, the end boom 78 can be raised and lowered by means of another hydraulic ram 84.

Carried at the free end of the end boom 78 is a heel boom 76 having a grapple 88 suspended from one end having jaws 87 and 89 which are actuated into open and closed positions by reason of a pair of rams 90, one such ram 90 appearing in FIGURE 1. At the other end of the heel boom 86 is a downwardly facing cradle 92. Through the agency of the heel boom 86, logs can be leveled in preparation for feeding to the reciprocal blade 56. Such logs appear in phantom outline in FIGURE 1 and have been labeled $T_1$.

For advancing or feeding the three-length logs into position for severance by the blade 56, there is a fixed guide 94 on the free end of a pair of laterally spaced inclined beams 96 and that clamping mechanism 98 travels back and forth along a track 100 fixedly supported between the beams 96 to present sections or portions of the logs $T_2$ to be cut to said blade 56. To simplify the drawing a chain 102 has been illustrated, being entrained about power-driven sprockets 104 to advance and retract the mechanism 98. Although requiring more manipulations on the part of the operator, it is possible, although not practical, to use the boom assembly 74 to feed the logs $T_2$ beneath the blade 56. The logs are guided into proper position beneath the blade 56 by a funnel 106.

After severance, the bolts or sticks are dropped into a collector denoted generally by the numeral 108 mounted on the platform or support 16.

The operation of the apparatus that has hereinbeen described is believed obvious from the foregoing description. However, it can be pointed out that the tree-length logs $T_1$ are picked up by the boom assembly 74 from a ground location. These logs after being deposited in the clamping mechanism 98 have been given the letter $T_2$. As shown in FIGURE 1, the clamping mechanism 98 has made one complete pass toward the blade 56 with the consequence that portions 109 of the desired length project to the left of this blade.

It is important to appreciate that the blade 56 which cooperates or coacts with the blade 64 is constrained to move in a substantially vertical path by the upstanding piston rods 32, 34 and the slidable cylinders 52, 54. All that the operator need do is to introduce hydraulic fluid under pressure through the hoses 44 into the lower end portions of the cylinders 52, 54 to force the cylinders downwardly, the fluids being discharge then to the portions of the cylinders beneath their respective pistons 38 by means of the ports 42, there being one such port clearly evident in FIGURE 3. When the blade 56 is to be raised, then fluid is directed into the upper portions of the cylinders 52, 54 through the hoses 50. Consequently, the cylinders 52, 54 can be forcibly moved substantially vertically, there being a slight rearward cant to the blade path as already pointed out. The piston rods 32, 34 function as guides for the cylinders 52 and 54 and hence for the flat blade 56 itself. No other guides are required.

Whenever the edge 58a becomes dull, the nuts 62 can be removed and the blade 56 quickly inverted so that the knife edge 58b becomes lowermost. Occasionally the anvil blade 64 will require replacement and then the nuts 72 are removed from the bolt 70.

It will be understood that any debris will be constantly wiped from the exposed portions of the piston rod 32, 34 when practising the present invention. Thus, on the downward stroke of the blade 56, the lower portions of the piston rods 32 and 34, such as those appearing in FIGURE 2, will be cleaned and then when the blade 56 is raised, the portions of the piston rods presently contained within the cylinders will be wiped.

What is claimed is:

1. A slasher comprising support means, a pair of generally upright piston rods having their lower ends affixed to said support means in a laterally spaced relation with each other, each of said rods having a piston intermediate its lower and upper ends, a cylinder slidably mounted on each of said piston rods in surrounding relationship to its respective piston for guided vertical movement, a flat blade member having its sides attached to said cylinders and extending therebetween so as to be movable vertically with said cylinders, said blade member having a downwardly directed knife edge, and means for positioning successive portions of tree-length logs beneath said blade member for severance by said knife edge when fluid under pressure is introduced into said cylinders below their said pistons to force said cylinders downwardly.

2. A slasher in accordance with claim 1 in which each piston rod has an axially extending bore leading upwardly and opening into its respective cylinder to introduce said fluid below said pistons.

3. A slasher in accordance with claim 2 in which each piston rod also has an axially extending bore leading downwardly and opening into its respective cylinder to introduce fluid under pressure into said cylinders above their said pistons to force the cylinders upwardly and thereby raise said blade member.

4. A slasher in accordance with claim 1 including a second flat blade member having its lower end fixedly attached to said support means and provided with generally vertical sides spaced sufficiently inwardly from said piston rods so as to permit said cylinders to move downwardly, said second blade member having an upwardly directed knife edge.

5. A slasher in accordance with claim 1 in which said blade member has an upwardly directed knife edge, and means detachably connecting the sides of said blade member to said cylinders so that said blade member can be inverted to permit said last-mentioned knife edge to be substituted for the first said-mentioned knife edge.

6. A slasher in accordance with claim 1 in which said piston rods also project through the upper ends of said cylinders.

7. A slasher in accordance with claim 6 including a transverse beam extending between, and connected to, the upper ends of said piston rods.

References Cited

UNITED STATES PATENTS

| | | | |
|---|---|---|---|
| 2,715,941 | 8/1955 | Rankin et al. | 83—639 |
| 2,816,608 | 12/1957 | Farmwald et al. | 83—639 |
| 2,986,057 | 5/1961 | Novak | 83—639 |
| 3,056,267 | 10/1962 | McRee | 144—34 |
| 3,351,107 | 11/1967 | Hamilton | 144—309 |
| 3,046,825 | 7/1962 | Thompson | 83—698 |

GERALD A. DOST, Primary Examiner

U.S. Cl. X.R.

83—639; 144—3